United States Patent [19]

Delage et al.

[11] Patent Number: 4,631,381

[45] Date of Patent: Dec. 23, 1986

[54] MAGNETIC YOKE INDUCTOR FOR GLASS FIBER MANUFACTURING EQUIPMENT

[75] Inventors: Daniel Delage, Grieres; Jean Reboux, Savigny sur Orge, both of France

[73] Assignee: Saphymo Stel, Massy, France

[21] Appl. No.: 760,308

[22] Filed: Jul. 29, 1985

[30] Foreign Application Priority Data

Aug. 3, 1984 [FR] France .................... 84 12335

[51] Int. Cl.$^4$ .............................................. H05B 6/40
[52] U.S. Cl. ............................. 219/10.57; 219/10.43; 219/10.79; 65/12; 65/274; 65/DIG. 4
[58] Field of Search ............... 219/10.79, 10.43, 10.57, 219/10.49 R, 8.5, 10.47; 65/12, 14, 6, 271, 274, 355, 356, DIG. 4

[56] References Cited

U.S. PATENT DOCUMENTS

| 2,873,344 | 2/1959 | Kocks et al. | 219/10.43 |
| 3,304,164 | 2/1967 | Charpentier et al. | 65/14 |
| 3,651,299 | 3/1972 | O'Neill | 219/10.43 X |
| 3,808,074 | 4/1974 | Smith et al. | 219/10.43 X |
| 3,846,609 | 11/1974 | Enk | 219/10.79 |
| 4,401,486 | 8/1983 | Pusateri et al. | 219/10.43 X |
| 4,438,310 | 3/1984 | Cachat | 219/10.43 |
| 4,472,616 | 9/1984 | Maurice et al. | 219/10.43 |

FOREIGN PATENT DOCUMENTS

| 968717 | 3/1958 | Fed. Rep. of Germany . |
| 843248 | 6/1939 | France . |
| 1169358 | 9/1959 | France . |
| 1241786 | 8/1960 | France . |
| 1270748 | 7/1961 | France . |
| 1392309 | 2/1965 | France . |

Primary Examiner—Philip H. Leung
Attorney, Agent, or Firm—Roland Plottel

[57] ABSTRACT

The novel inductor is used in a glass fiber manufacturing equipment comprising a centrifuge heated by a main gas heating device and a complementary induction heating device. The efficiency of the inductor is increased by a magnetic flow guiding element disposed between the inductor and the main heating device. The invention is particularly adapted to be used in the manufacture of glass wool.

10 Claims, 9 Drawing Figures

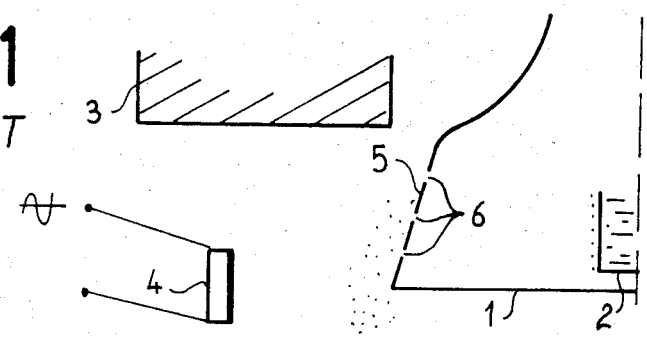
FIG_1
PRIOR ART
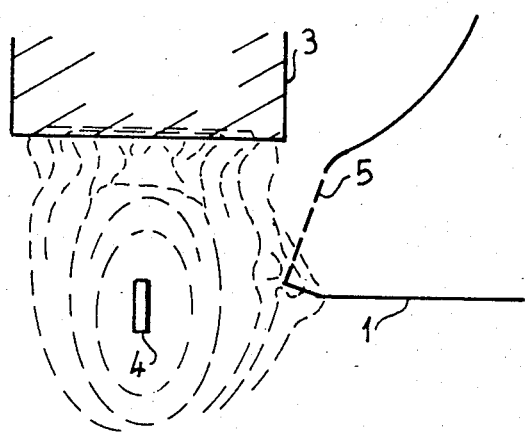
FIG_2
PRIOR ART
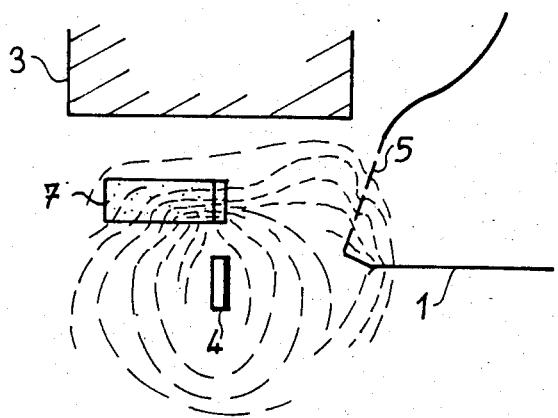
FIG_3

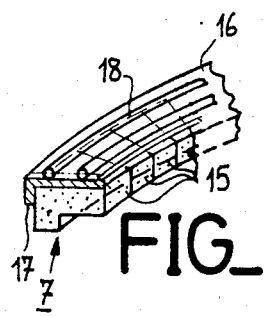
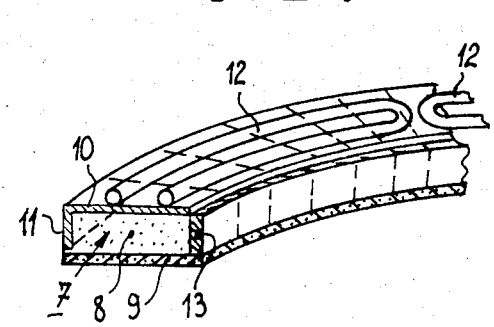
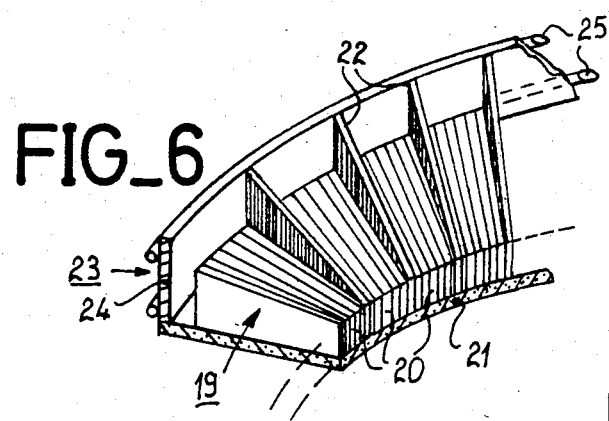
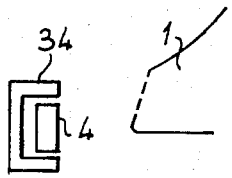
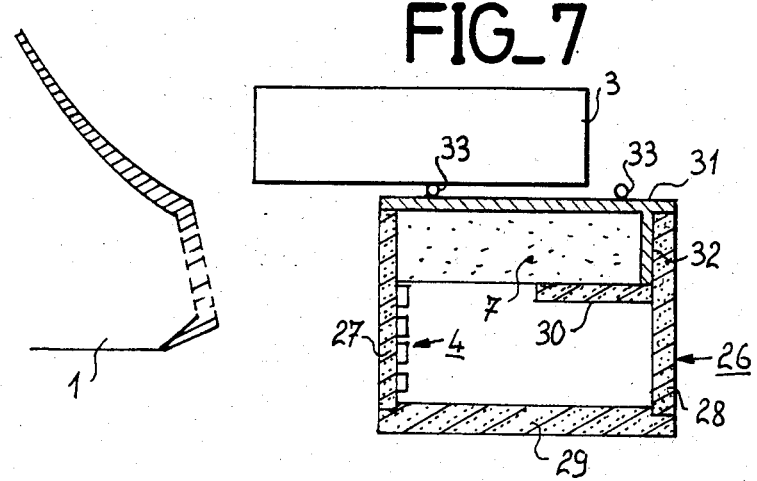

FIG_9
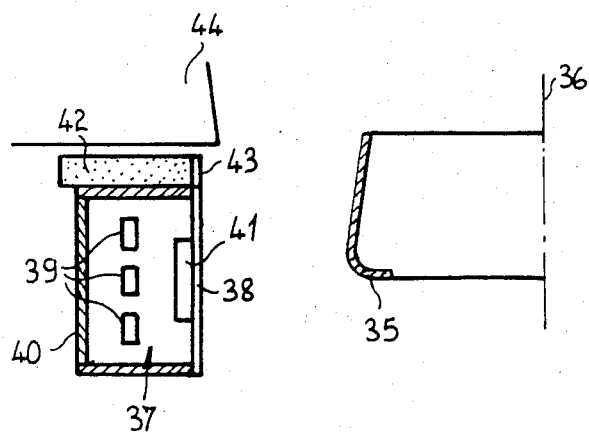

1

MAGNETIC YOKE INDUCTOR FOR GLASS FIBER MANUFACTURING EQUIPMENT

FIELD OF THE INVENTION

The present invention is related to a magnetic yoke inductor for glass fiber manufacturing equipment.

The manufacture of glass fibers, especially for heat isolation purposes, generally involves the use of equipment which essentially comprises a centrifugal machine (or centrifuge), the side wall of which is heated by a mixed heating system including a main heating device provided with gas burners and including a complementary induction heating device.

Since, in particular, the main heating device is located in the vicinity of the centrifuge and the complementary heating device, and since it constitutes an important metallic mass absorbing a substantial portion of the heat supplied by the complementary heating device, the yield, or efficiency, of said complementary heating device is low and its zone of effective action on the side wall of the centrifuge is reduced.

OBJECT OF THE INVENTION

The aim of the present invention is to allow the efficiency of the complementary heating means, as well as, possibly, its zone of efficient action, to be increased without modifying the manufacturing equipment and without appreciably impeding the manufacturing process.

SUMMARY OF THE INVENTION

With these and other objects in view the invention provides an induction flow guiding element made of magnetic material (and also called herein-after "magnetic element") which directs at least part of the leakage flow to the centrifuge of the equipment and which has low energy dissipation characteristics at the frequency of the current supplied to the inductor, said magnetic element being located in the vicinity of the main heating device.

In one preferred embodiment of the invention said element of magnetic material, or magnetic element, has the shape of a ring member the axis of which substantially coincides with the axis of rotation of the centrifuge, said ring member being located between the inductor and the main heating device, and the inner diameter of said inductor which also has the general shape of a ring member.

The above and other aims, objects and features of the present invention will be more clearly apparent from the following detailed description of several embodiments thereof, which is given with reference to the appended drawing and by way of illustration but not of limitation.

BRIEF DESCRIPTION OF THE DRAWING

In the drawing:

FIG. 1 is a simplified sectional view of a conventional glass fiber manufacturing equipment.

FIG. 2 is a view similar to that of FIG. 1, wherein the magnetic flow lines generated by the complementary heating device are indicated.

FIG. 3 is a view similar to that of FIG. 2, but related to a device according to the invention.

FIGS. 4 to 6 are simplified and partial views of various embodiments of the device according to the invention.

FIG. 7 is a simplified sectional view of an equipment including the device according to the invention, and shows the mode of incorporation of said device in the equipment.

FIG. 8 is a simplified schematic view of a modified embodiment of the magnetic element according to the invention.

FIG. 9 is a simplified sectional view of an advantageous embodiment of the equipment according to the invention.

DETAILED DESCRIPTION OF PREFERRED EMBODIMENTS OF THE INVENTION

The glass fiber manufacturing equipment as schematically shown in FIG. 1 is a conventional equipment comprising essentially a centrifuge 1 made of refractory alloy steel, resisting to the action of the glass, and rotating at a speed of several thousand r.p.m., said centrifuge including a metallic bowl 2 into which liquid glass is introduced in a manner not shown here, a main heating device 3 comprising gas burners, and a complementary induction heating device the inductor of which is indicated schematically at 4. Elements 1 to 4 are generally symmetrical with respect to an axis of revolution.

At its lower part centrifuge 1 has a slightly tapered, downwardly flaring profile, and its side wall 5 extending in said lower part is provided with a very great number of very fine through-holes 6 (several tens of holes per square millimeter) through which the liquid glass is ejected, said side wall being heated to a temperature of about 1000° to 1050° C. Heating to such temperature is achieved through the combined actions of heating devices 3 and 4, heating device 4 acting essentially on the lower zone of the lateral side wall of centrifuge 1, while the main heating device principally acts on the upper zone of said side wall.

Complementary heating inductor 4 is supplied with energy by an alternative current source operating at a frequency generally comprised between 1 and 10 kHz, and in most cases between 3 and 10 kHz. The inductor may be constructed in various manners: it may be in the form of a ring member, or in the form of a plurality of ring members supplied with current in series or in parallel, and aligned along one or more generatrices. With a view to homogenizing the temperature of the perforated wall of the centrifuge, the relative positions of elements 1, 3 and 4 are conveniently adjusted, while providing sufficient space around the perforated wall of centrifuge 1, so as to allow the glass fibers to be evacuated.

As regards the electrical aspect, inductor 4 is coupled to two induced circuit elements, to wit, on the one hand, centrifuge 1 which constitutes the main induced circuit element and, on the other hand, the metallic part of device 3 which is placed directly in the leakage flow path of inductor 4, thus forming, in fact, an auxiliary induced circuit element. Since the main induced circuit air-gap —i.e., the interval between the main induced circuit element and the inductor- has to be large so as to accommodate the glass fiber flow, the coupling of said main induced circuit element to the inductor is rather loose and corresponds, in fact, to the coupling rate of the auxiliary induced circuit element.

FIG. 2 shows in dash-lines the electromagnetic flow lines generated by inductor 4 in the above-described equipment. It can be seen that this electromagnetic flow expands widely and is concentrated at the base of device 3, at which location considerable losses due to the Joule effect will occur, as well as at the lower part of the perforated wall 5 of centrifuge 1. Energy dissipation measurements have shown that said losses due to the Joule effect are about as great as the "useful" power dissipation in the region of the perforated centrifuge wall. It has been observed that the effective energetic yield (or efficiency rate) of the complementary heating means is quite low, not exceeding about 30%.

The device according to the present invention is aimed at increasing this energetic yield by improving the thermal efficiency of the inductor with respect to the main induced circuit element constituted by the perforated wall of the centrifuge, while at the same time correspondingly decreasing the losses occuring in heating device 3. According to the invention such improvement of the thermal efficiency of the induction heating device is achieved by providing an element 7 (cf. FIG. 3) made of magnetic material in the vicinity of inductor 4 and heating device 3 in such a manner that a maximum amount of the induction flow is deviated from said heating device towards the perforated wall 5 of centrifuge 1. Of course, said element 7 must not dissipate power, nor may it be allowed to be saturated, wherefrom it follows that its technological features are determined by the frequency of the current supplied to the inductor.

Element 7 has the shape of a ring member aligned with the axis of rotation of the centrifuge, said ring member being either continuous or discontinuous, in which latter case the discontinuities are preferably regularly spaced from each other. The ring member constituted by element 7 has a diameter substantially smaller than that of inductor 4, so as not to impede the flow of the glass fibers, said element being located substantially half-way between inductor 4 and heating device 3. Under these conditions, as illustrated in FIG. 3, the inductor flow lines will concentrate, on their path between inductor 4 and device 3, in element 7 and, instead of reaching device 3, will almost completely be deviated toward wall 5 which presents, in height, a larger zone (as compared to the case illustrated in FIG. 2) adapted to receive the induction flow, whereby the efficiency of the complementary heating means is substantially increased (by about 50%). Thus for a given value of electrical power that zone of wall 5 which is heated by induction can be increased, resulting in an increase of about 200° C. of the temperature of said zone, or else the electric energy supplied to the inductor can be reduced, or the inner diameter of said inductor can be increased so as to provide an induction-heated zone substantially as large as in the case illustrated in FIG. 1; it is also possible to decrease the heating power of device 3 while maintaining a given value of the electric power, or to slightly increase the distance between device 3 and the inductor so as to further increase the efficiency of the latter; furthermore it is possible as well, while maintaining given respective energy values of the electric and main heating means, to increase the height of the perforated centrifuge wall. In addition, it is equally possible, of course, to take more than one of the afore-mentioned steps simultaneously, for example, the power of both heating devices may be decreased, or the inner diameter of the inductor may be increased while the power of device 3 is decreased.

The material of which element 7 is made should have low dissipation properties when it is subjected to induction lower than the saturation admissible for such material. When the frequency of the current supplied to inductor 4 is comparatively high, i.e. comprised between about 5 and 10 kHz, or even higher, said material is preferably of the "ferrite" type based on sintered magnetic oxides, such as for example those known under the designations 3C6 or 3C8 and provided by the PHILIPS Company. When the frequency of said current is lower than about 5 kHz element 7 will preferably be made of oriented thin magnetic metal sheets of the type used for constructing low-frequency transformer magnetic circuits.

FIG. 4 shows an embodiment of element 7 which uses ferrites 8 placed onto a base plate 9 in the form of a planar annular member of refractory material, said material having satisfactory electrically and thermally isolating properties and high mechanical strength, as is the case, for example, of the materials known under the designations of "micanite", "asbestolithe" or "syndanio". Ferrites 8 are simple sticks in the form of elongated rectangular parallelepipeds, and are commercially available. These sticks are disposed radially on supporting base 9 to which they may be possibly bonded by means of a convenient adhesive or glue. Preferably said sticks are placed in mutual engagement on the side of the inner periphery of supporting base 9. The wedge-shaped intervals between adjacent sticks may be left empty, or may be filled with an adhesive or an electrically isolating material, or also with ferrite powder which may be compacted with a convenient binding agent. It will be understood that instead of using such ferrite sticks, element 7 may be specially molded in the form of a ring member, although this may prove to be a more expensive method than using standard sticks. Cooling of element 7 is affected by a plate 10 made of metallic material having a high thermal conductivity, such as copper. Said plate 10 has the shape of a planar annular member, or ring, which is provided with a radial slot adapted to prevent generation of eddy currents. The inner diameter of plate 10 is substantially equal to that of the annular member formed on element 7, whereas its outer diameter may be equal to, or greater than, that of element 7. If required, a flange portion 11 of plate 10 may also cover the outer periphery of element 7 over at least part of its height. As a variant, flange portion 11 can be replaced by a metallic foil, such as copper foil, distinct from plate 10, which encircles element 7; such foil must, of course, be slotted as well, along one generatrix of the cylindrical surface it forms, so as to prevent generation of eddy currents. Plate 10 as well as, possibly, flange portion 11 or the above-mentioned metal foil are advantageously cooled themselves by a heat exchanger device 12 constituted, for example, by a copper tube welded or soldered onto the upper face of plate 10 and, possibly, flange portion 11, a convenient cooling fluid being made to flow through said tube. Obviously, with a view to preventing eddy currents from being generated in said tube, it should not be constructed in the form of a simple loop, but in the form of a curved double "U" wherein the ends of two of the curved segments are interconnected while the other ends are connected to fluid inlet and outlet conduits, respectively.

The thermal protection of the inner peripheral surface of element 7 against the radiation emitted by the centrifuge is achieved by a plate 13 having the form of a circular cylinder portion, the outer diameter of which is substantially equal to the inner diameter of element 7, its height being equal to the thickness of said element. Plate 13 can be advantageously made of the same isolating and refractory material as that constituting plate 9, and it is bonded onto the latter and/or onto element 7.

FIG. 5 is a partial view of a modified form of the embodiment of FIG. 4. In this variant the individual ferrites 15 have the form of an "L" the larger leg of which is disposed horizontally while the smaller leg extends downwardly. These ferrites are assembled in the same manner as ferrites 8 of the embodiment shown in FIG. 4, and are covered by metallic plate 16 which is similar to plate 10. Said plate 16 may comprise a flange portion 17, and a heat-exchanger tube 18 may be welded onto its upper surface.

The embodiment shown in FIG. 6 is adapted to be used in combination with an inductor operating at a comparatively low frequency, e.g. lower than 5 kHz. The annular magnetic element (or magnetic ring element) 19 shown in part in FIG. 6 is made of rectangular lamellar metal sheets disposed parallel to the lines of magnetic flow induced by the inductor, i.e., in a radial direction. These metal sheets advantageously are of the same type as those used for constructing conventional low-frequency transformer magnetic circuits. At low frequencies the ferrites would be easily saturated by the inductor flow and thus would cause losses due to the Joule effect, which would be contrary to the desired result, whereas the metal sheets are more difficult to saturate.

Said lamellar metal sheets are electrically isolated from each other and assembled to form sheet packs 20 comprising each one or several tens of sheets. The successive packs 20 are placed onto a support plate 21 similar to plate 9, and are separated from each other by plates 22 of a material having a high heat conductivity, such as copper. These plates 22, the larger surface of which has a rectangular or trapezoidal shape, constitute wedges and are forcedly inserted between the successive packs 20 so as to be in intimate thermal contact therewith. Plates 22 extend downwardly to the level of packs 20 and in front of the centrifuge, but project upwardly beyond said packs and the outer peripheral surface of the ring member constituted by element 19 (i.e., beyond that face which is located in front of the centrifuge). On the side of this outer peripheral surface, plates 22 are connected, for example by soldering, to a heat exchanger 23. Heat exchanger 23 comprises, for example, as shown in FIG. 6, a metal plate 24, advantageously a copper plate, in the form of a circular cylinder portion the height of which is substantially equal to that of the outer front faces of plates 22, and the diameter of which is so selected that plate 24 engages said outer front faces of plates 22 onto which it is soldered. One or more tubes 25 through which flows a convenient cooling medium are soldered onto the outer face of plate 24. It goes without saying that plate 24 and tubes 25 do not form continuous turns so as to induce no eddy currents.

FIG. 7 shows an embodiment of an assembly comprising an inductor and a magnetic flow guiding element which is particularly advantageous for industrial use under difficult environmental conditions such as will be encountered in the case of modern equipment for producing glass wool, especially as regards the temperature in the vicinity of the centrifuge. In this embodiment inductor 4 and element 7 or 19 (constituted by ferrite material or lamellar metal sheets) are enclosed in an annular casing 26 which is concentric with the axis of centrifuge 1. Casing 26 comprises two concentric straight circular cylinder portions 27, 28 of equal heights, made of refractory material which provides for efficient thermal and electrical isolation, said material being of the same type as that of support 9 in the embodiment of FIG. 4. Inner cylinder 27 and outer cylinder 28 are attached to a thick annular disk 29 made of the same material as that of said cylinders. The inner diameter of disk 29 is equal to the inner diameter of cylinder 27, while its outer diameter is equal to that of cylinder 28.

Inductor 4 and magnetic element 7 (or 19) are disposed inside the annular casing formed by elements 27, 28 and 29. This inductor 4 may comprise a plurality of annular turns fixedly mounted and superimposed on one another, at the base of cylinder 27. Magnetic element 7 (or 19) is located in the upper portion of said casing and mounted onto a support 30. Support 30 may be constituted, for example, by an annular disk fixed to cylinder 27 and/or cylinder 28 at a height so selected that the upper portion of said magnetic element reaches the level of the upper face of cylinders 27 and 28. The cover of the casing is constituted by an annular metallic (e.g. copper) disk 31 having diameters substantially equal to those of disk 29 and being provided with a slot for preventing the generation of eddy currents. Disk 31 is mounted in intimate thermally conductive contact with element 7. It may be associated to a slotted cylinder 32 made of the same metallic material as that of disk 31 and surrounding the outer peripheral surface of element 7. When said magnetic element is constituted by lamellar metal sheets, cover 31 may engage plates 22 and thus perform the function of the heat dissipator 24 shown in FIG. 6. A heat exchanger 33 of the same type as those shown in FIGS. 4 to 6 is soldered onto cover 31 and/or cylinder 32.

FIG. 8 shows in a simplified schematic form a magnetic element 34 surrounding inductor 4 on all sides except the side facing the centrifuge 1. This element 34 is made of ferrite or lamellar metal sheets, depending on the frequency of the induction current. When made of ferrite, said element may be produced in the form of a one-piece molding, or by using conveniently arranged ferrite sticks, or in the form of annular disks and ferrite cylinders. Such magnetic element may advantageously be placed in a casing as shown in FIG. 7, and is, of course, associated to a cooling system similar to one of those described herein-before.

The embodiment schematically shown in FIG. 9 includes a centrifuge 35 having a maximum diameter of about 310 mm and rotating about an axis 36. Centrifuge 35 cooperates with an inductor 37 supplied in the present example with 800 V, 10 kHz current. Inductor 37 comprises one inner turn 38 made of copper and presenting a rectangular cross-section the larger side of which is vertical, and three outer turns 39 which are also made of copper. Turns 39 also have a rectangular cross-section the length of which is, however, smaller than that of turn 38. The three turns 39 are aligned vertically and spaced from each other by a small distance, the larger sides of their cross-sections being vertical.

The central one of turns 39 is located substantially on the level of the middle of turn 38, which central level corresponds substantially to the level of the lower end of centrifuge 35. The height (i.e. the length of the larger side of the cross-section) of turn 38 is about 60 mm, and this turn is made either from a copper tube or from a flat copper section onto the peripheral surface of which a tube 41 is soldered and allows a cooling liquid to be circulated therein. The three turns 39 are electrically connected in series with turn 38.

Inductor 37 is enclosed in an annular casing 40 having a rectangular cross-section, the face of said casing which faces centrifuge 35 being constituted by turn 38, while its faces are defined by plates of isolating material which may be the same, for example, as the one used for plates 27 to 29 in the embodiment of FIG. 7.

A ring member 42 made of magnetic material, preferably ferrite, is placed on the upper face of casing 40. Ring member 42 may be constructed in accordance with any one of the embodiments described hereinabove with reference to FIGS. 4, 5 or 6. The inner peripheral surface of ring member 42 is thermally protected by a ring member 43 of isolating material which may be the same, for example, as the material constituting the isolating parts of casing 40, said ring member 43 having an inner diameter substantially equal to that of the annular element constituted by turn 38. A blowing ring member 44 is arranged above ring member 42.

One of the advantages of the embodiment of FIG. 9 resides in the fact that the wall constituted by turn 38 facing centrifuge 35 is not made of isolating material to which the glass fiber might adhere, thus obstructing the passage between the centrifuge and the inductor, said wall being made of copper to which the fiber will practically not adhere at all.

It will be understood that, when centrifuge 35 is larger, or when the frequency of the current feeding the inductor is lower (for example 3 kHz) the number of outer turns of the inductor may be different, while the inner turn 38 will not be modified. The inductor may comprise two outer turns 39, or one outer turn, or no outer turn at all.

Testing an installation such as the one described hereinabove with reference to FIG. 9 with and without the ferrite ring member 42 have provided the following results, as regards the current supplied to the inductor, the centrifuge having a maximum diameter of 310 mm, and the above-mentioned results being obtained for equal thermal conditions prevailing at the perforated centrifuge side-wall:
  without ferrite: 20 kW
  with ferrite: 11 kW,
which corresponds to a gain of approximately 50%.

Furthermore, by optimizing the relative arrangement of the main heating device, the inductor and the centrifuge it is possible, when supplying the inductor with 20 kW, to heat to a temperature of 950° C. two-thirds of the perforated side wall of the centrifuge, instead of one third when using no ferrite, and in certain cases the induction heating may become the main heating, the gas heating then operating as a complementary heating.

The invention is not limited to the embodiments shown and described herein. Many modifications and variants can be envisaged by those skilled in the art without departing from the spirit and scope of the invention as defined in the appended claims.

What is claimed is:

1. A glass fiber manufacturing equipment comprising a centrifuge, a main gas heating device and a complementary induction heating device with an annular inductor (4) and a separate magnetic induction flow element (7) adapted to direct at least part of leakage flow towards the centrifuge of said equipment, said element having low energy dissipating characteristics at the frequency of the current supplied to said inductor.

2. Equipment according to claim 1, wherein said magnetic element is located at least between said main heating device to operate and the glass fibers issuing from said centrifuge to flow without being substantially impeded by said magnetic element.

3. Equipment according to claim 1, wherein said magnetic element (34, FIG. 8) surrounds said inductor (4) on all sides of the latter except the side thereof which faces said centrifuge.

4. Equipment according to claim 1, wherein said magnetic element has the shape of a ring member the axis of which substantially coincides with the axis of rotation of said centrifuge, the inner diameter of said ring member being substantially equal to the inner diameter of said inductor.

5. Equipment according to claim 1, wherein said magnetic element is connected to a thermal exchanger so as to establish an intimate thermal contact therewith.

6. Equipment according to claim 1, which is supplied with an electric current having a frequency higher than about 5 kHz, and wherein said magnetic element is made of a ferrite-based material.

7. Equipment according to claim 1, which is supplied with an electrical current having a frequency lower than about 5 kHz, and wherein said magnetic element is constituted by radially disposed lamellar metal sheets.

8. The equipment of claim 7, wherein said metal sheets are assembled so as to form metal sheet packs which are separated by wedge-shaped metal plates with which said packs are in intimate thermal contact, said plates being connected to a heat exchanger.

9. Equipment according to claim 1, wherein said magnetic element is mounted within a casing made of refractory, thermally isolating and electrically isolating material.

10. The equipment of claim 9, wherein said casing also encloses said inductor.

* * * * *